United States Patent [19]
Hall

[11] Patent Number: 6,118,578
[45] Date of Patent: Sep. 12, 2000

[54] SIMPLIFIED DUAL FIELD OF VIEW AFOCAL

[75] Inventor: John M. Hall, Alexandria, Va.

[73] Assignee: The United States of America as represented by the Secretary of the Army, Washington, D.C.

[21] Appl. No.: 09/084,872

[22] Filed: May 28, 1998

[51] Int. Cl.⁷ .............................. G02B 13/14; G02B 3/00
[52] U.S. Cl. .......................... 359/356; 359/355; 359/357; 359/642
[58] Field of Search .................................. 359/356, 357, 359/642, 355

[56] References Cited

U.S. PATENT DOCUMENTS

| | | | |
|---|---|---|---|
| 4,505,535 | 3/1985 | Neil | 350/1.3 |
| 4,621,888 | 11/1986 | Crossland et al. | 350/1.2 |
| 4,989,962 | 2/1991 | Kebo | 350/537 |
| 5,214,532 | 5/1993 | Hall et al. | 359/356 |
| 5,282,083 | 1/1994 | Hall | 359/357 |
| 5,479,016 | 12/1995 | Curry et al. | 250/334 |

*Primary Examiner*—Georgia Epps
*Assistant Examiner*—Suzanne Letendre
*Attorney, Agent, or Firm*—Milton W. Lee; John E. Holford; Alain L. Bashore

[57] ABSTRACT

An infrared afocal lens assembly for providing an observed magnified IR image scene with a field of view and a substantially less temperature dependent performance. The assembly includes a collecting lens, focusing lens subassembly movable along the optical axis to provide range focus, an intermediate focal plane, an eyepiece lens subassembly, and an aperture stop. A wide field of view lens subassembly may be used on the optical axis. All lenses are made of either GaAs or ZnS, and all lenses are single lenses only.

9 Claims, 4 Drawing Sheets

SIMPLIFIED DUAL FIELD OF VIEW AFOCAL

BACKGROUND OF THE INVENTION

1. Field of the Invention

The present invention generally relates to IR (infrared) afocal lens assemblies and more specifically, to a simplified dual field of view IR afocal assembly with substantally lens temperature independent performance.

2. Description of Prior Art

The purpose of an IR Afocal lens assembly is to collect collimated (plane wave) infra-red light, focus the rays in an image plane, and re-collimate the light through an exterior exit pupil. IR Afocals are in common use today in both military and industrial sensor systems. The design of an afocal is constrained by the desired field of view, resolution, and size allocated by the system designer. For many compact IR sensor systems, Germanium is often the only lens material that allows high performance with reduced complexity and affordable cost. Germanium is common in all current Army GEN I FLIR systems fielded today. Unfortunately, Germanium also undergoes dramatic changes in transmission and index of refraction as temperature rises over C. Depending on the total amount of Germanium in a given system, system performance can degrade rapidly in high temperature environments. The degradation includes a reduction in optical transmission due to the increased absorption, and a drastic change in optical power as the index of refraction changes with temperature.

The desired performance of typical afocal assemblies require complicated lens geometries and special lens manufacturing tolerances in order to achieve diffraction limited resolution across the field of view. The requirement for an external exit pupil necessitates an intermediate focal plane, making the afocal assembly an "inverting" of "kepplerian" form. The aspheric lens are typically employed to reduce the total lens count.

While the prior art has reported using afocal lens assemblies none have established a basis for a specific assembly that is dedicated to the task of resolving the particular problem at hand. What is needed in this instance is a simplified non-germanium infrared (IR) afocal lens assembly with substantially less temperature dependent performance.

SUMMARY OF THE INVENTION

It is therefore one object of the invention to provide a simplified infrared (IR) afocal lens assembly with substantially less temperature dependent performance.

According to the invention, there is disclosed an infrared (IR) afocal lens assembly for providing an observed magnified IR image scene with alternative field of view and a substantially less temperature dependent performance. A GaAs meniscus lens collects IR input light which is then input to a wide field of view (WFOV) lens subassembly optionally insertable onto the optical axis for providing a WFOV. The WFOV lens subassembly further including two WFOV single GaAs lenses and one WFOV single 0.40 cm thick ZnS lens. A focusing lens subassembly on the optical axis after the WFOV lens subassembly provides focus. The focusing lens assembly further includes one focusing single GaAs lens and one focusing single 0.40 cm thick ZnS lens. An intermediate focal plane on the optical axis after said focusing lens subassembly has an accesible intermediate focus. An eyepiece lens collimates the intermediate focus and provides an external exit pupil. The eyepiece lens subassembly includes one eyepiece single 0.40 cm thick ZnS lens and one eyepiece single GaAs lens. An aperture stop on the optical axis provides the final focal point of the IR input light.

Substantially no change in index of refraction and absorption occurs with moderate increase in lens temperatures due to the nature of the lens materials. A narrow field of view (NFOV) of an IR image is observed magnified through the IR afocal lens assembly and when the WFOV lens subassembly is inserted onto the optical axis a WFOV of an IR image is observed magnified through the IR afocal lens assembly.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
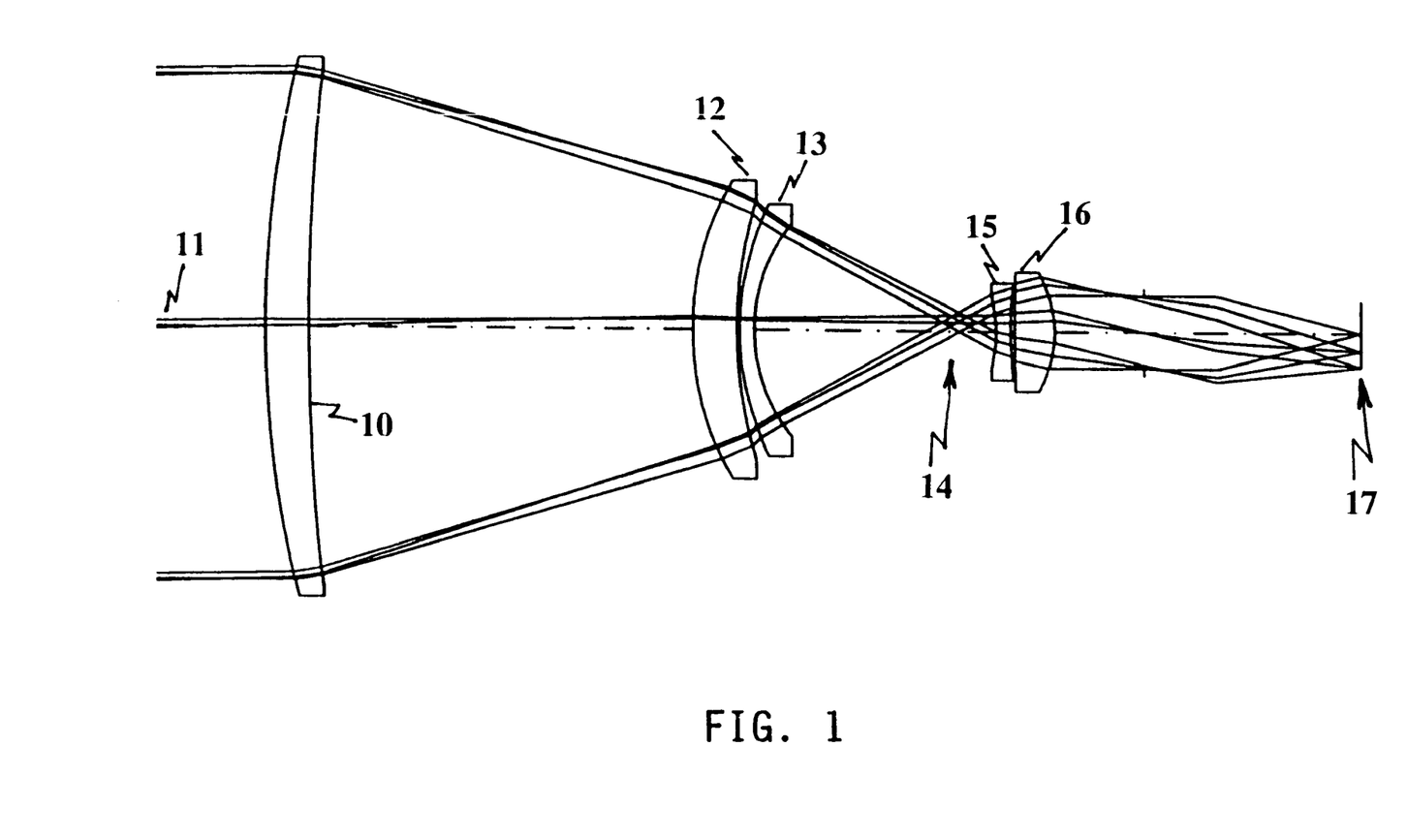
FIG. 1 is the optical layout diagram for the Narrow Field of View (NFOV) configuration of the present invention.

Referring now to the drawings, and more particularly to FIG. 1, there is shown the optical layout diagram for the Narrow Field of View (NFOV) configuration of the present invention. Lens element 10 on optical axis 11 is a meniscus lens with two positive and is made of GaAs. The front of lens 10 is aspheric, and follows the polynomial equation for general aspheres. Lens 12 is a positive meniscus lens made of GaAs with an asphere on the back surface. Lens 13 is another meniscus lens made of ZnS with an aspheric on the front side. Together, lens elements 12 and 13 form a focusing group which may be moved along the optical axis to provide range focus for objects not at infinity. Lens 13 is followed by intermediate focal plane 14 which describes the afocal assembly as "re-imaging", "inverting", or "Keplerian." Lens elements 10, 12, and 13 have a combined focal length of 14.0 cm, yielding an F/1.0 objective due to the 14 cm aperture. Lens elements 15 and 16 form the "eyepiece" section of the afocal. The "eyepiece" collimates the intermediate focus and provides an external exit pupil. The "eyepiece" section has a focal length of 2.0 cm, and operates at F/1.0 due to the 2 cm exit pupil. Lens element 15 is a negative lens made of ZnS and has an aspheric front. Lens element 16 is a strong positive lens made of GaAs with an aspheric back. The last surface is aperture stop 17 which is located 2.5 cm away from the vertex of the last GaAs lens, and thus allows ample room for a right-angle scan mirror to direct the beam perpendicularly into a set of imaging optics. The design is surprisingly flexible in regards to stop location, which may be varied by 0.5 cm or more in either direction along the optical axis without much degradation in off-axis FOV performance.

Figure 2:
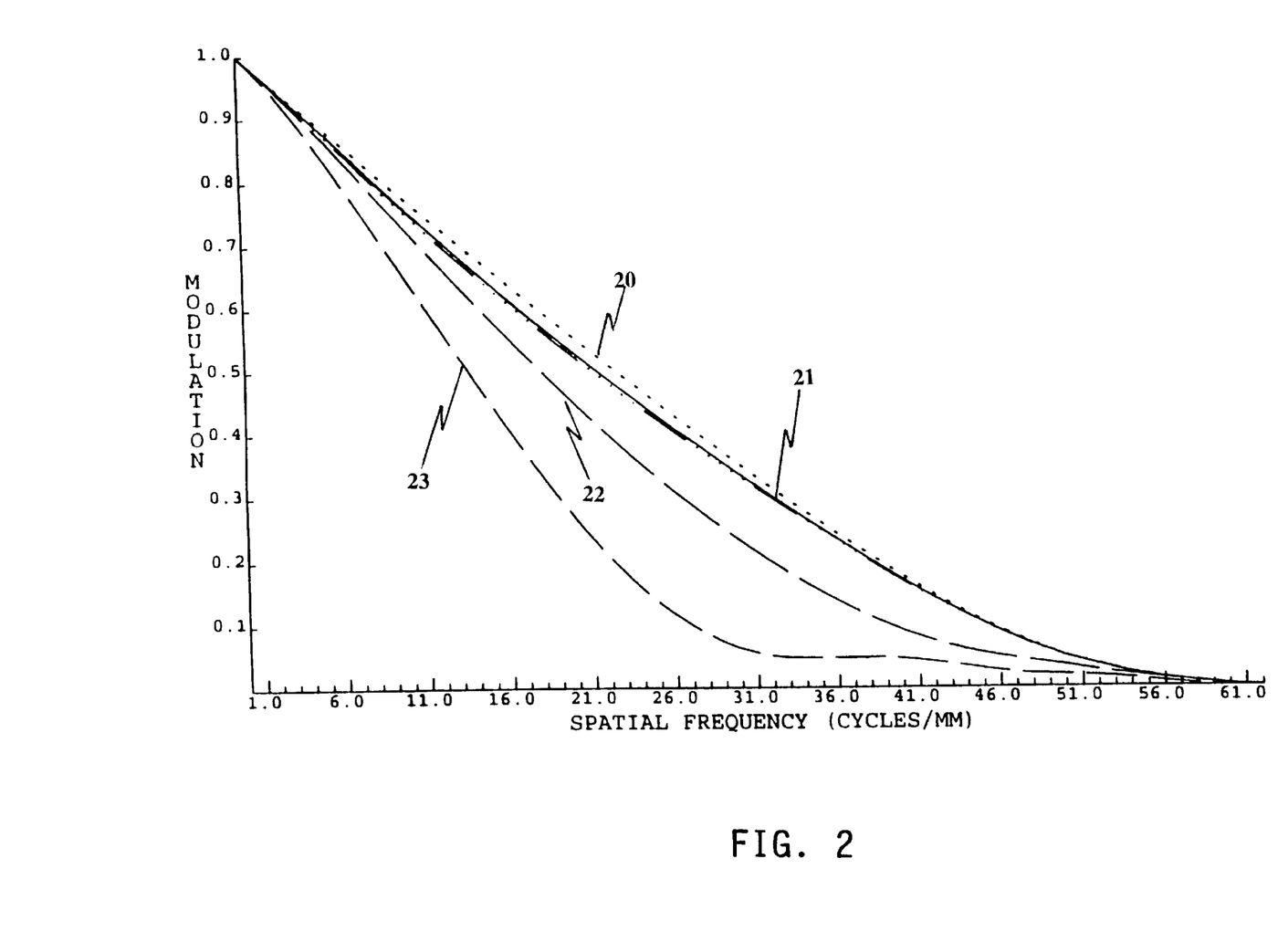
FIG. 2 is the Modulation Transfer Function (MTF) Resolution Performance graph for the NFOV configuration of FIG. 1.

FIG. 2 is the Modulation Transfer Function (MTF) Resolution Performance graph for the NFOV configuration of FIG. 1. One of the performance measurements of the assembly is its resolution represented as the on-axis MTF at zero degrees FOV and the off-axis MTF at the maximum FOV. Line 20 is the diffraction limit and line 21 is the on-axis MTF. Lines 22 and 23 represent the tangential and sagittal components of the maximum FOV (1.0 field at 3.30 degrees) respectively. As seen from FIG. 2 the MTF on-axis yields high resolution at approximately 50% at 20 cycles/mm.

Figure 3:
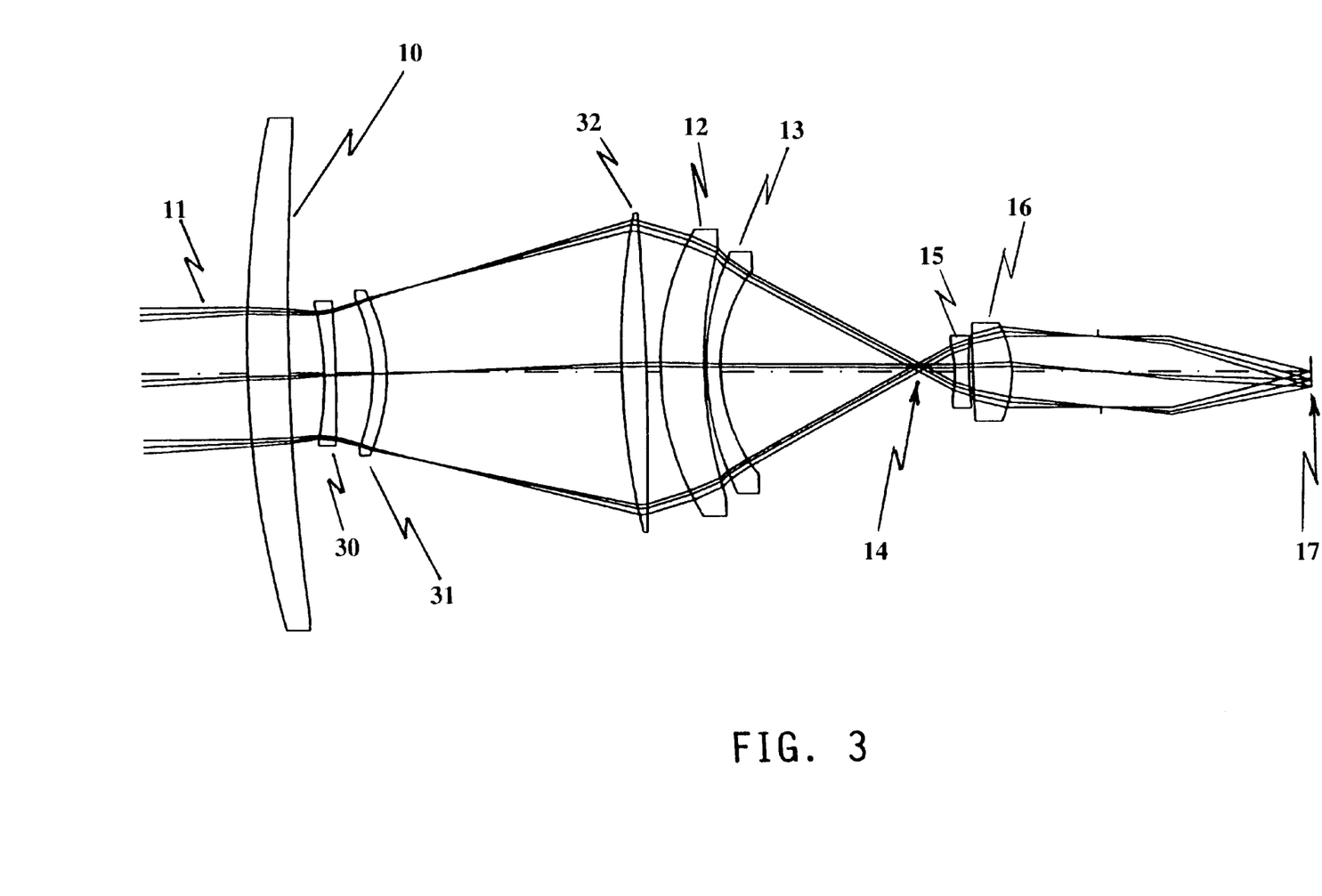
FIG. 3 is the optical layout diagram for the Wide Field of View (WFOV) configuration of the present invention.

FIG. 3 shows the optical layout diagram for the Wide Field of View (WFOV) configuration of the present invention. Lens element 10 on optical axis 11 is a meniscus lens with two positive curvatures and is made of GaAs. The front of lens 10 is aspheric, and follows the polynomial equation for general aspheres. Lens element 30 is a GaAs reverse mensicus lens with two negative curvatures, and an asphere on the rear. Lens 31 is another mensicus lens with two negative curvatures made of ZnS. The ZnS material is required to achieve color correction and aids aberrational balance. The back of Lens 31 is aspheric. Lens element 32 is a positive lens made of GaAs and has an aspheric back. Lens 12 is a positive meniscus lens made of GaAs with an asphere on the back surface. Lens 13 is another meniscus lens made of ZnS with an aspheric on the front side. Together, lens elements 12 and 13 form a focusing group which may be moved along the optical axis to provide range focus for objects not at infinity. Lens 13 is followed by intermediate focal plane 14 which describes the afocal assembly as "re-imaging", "inverting", or "Keplerian." Lens elements 10, 30, 31 32, 12, and 13 have an effective focal length of 3.73 cm, and form a F/1.0 objective due to the 3.73 cm usable aperture. Lens elements 15 and 16 form the "eyepiece" section of the afocal which has already been described earlier.

Figure 4:
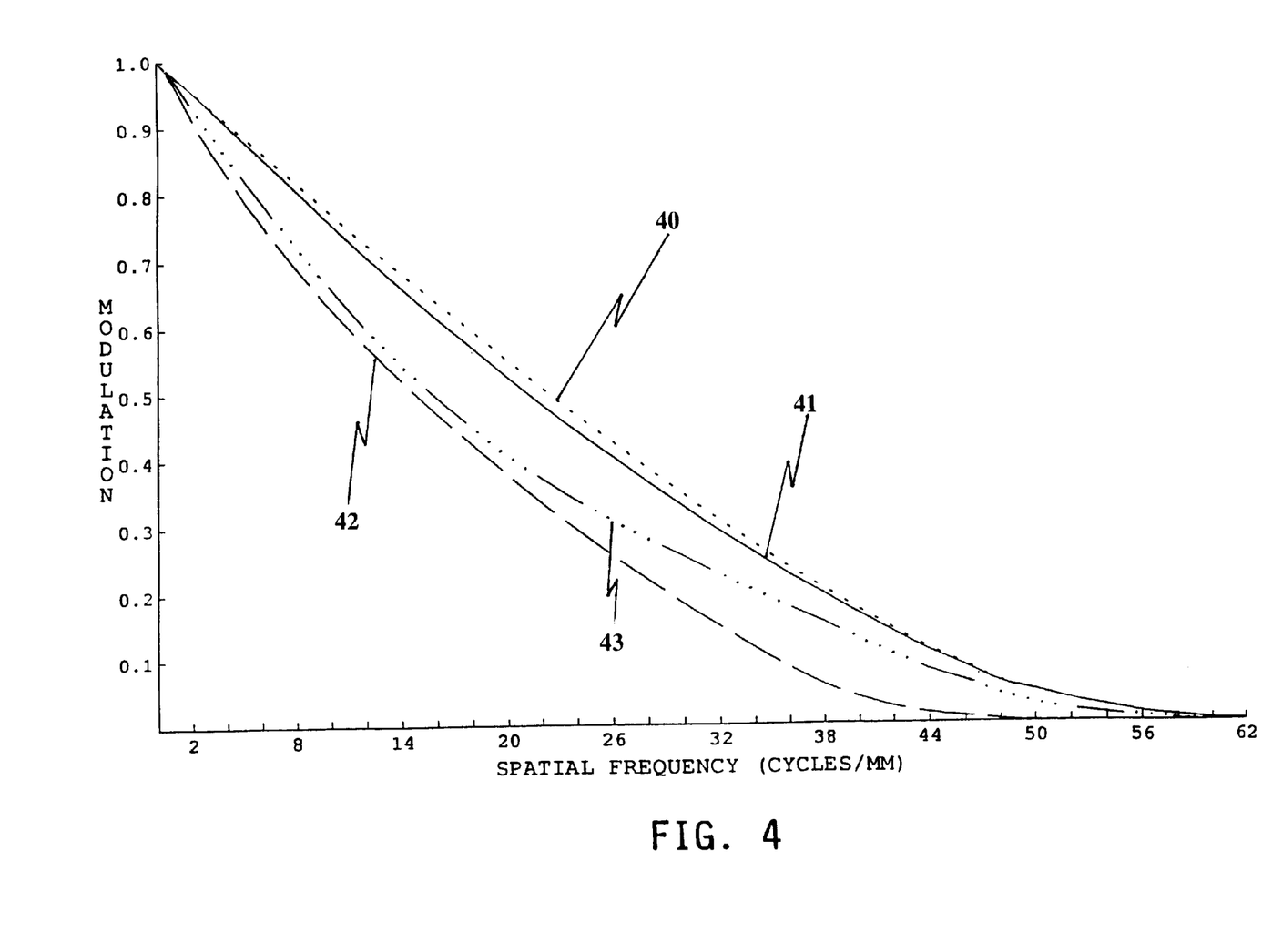
FIG. 4 is the Modulation Transfer Function (MTF) Resolution Performance graph for the WFOV configuration of FIG. 3.

FIG. 4 is the Modulation Transfer Function (MTF) Resolution Performance graph for the WFOV configuration of FIG. 3. One of the performance measurements of the assembly is its resolution represented as the on-axis MTF at zero degrees FOV and the off-axis MTF at the maximum FOV. Line 40 is the diffraction limit and line 41 is the on-axis MTF. Lines 42 and 43 represent the tangential and sagittal components of the maximum FOV (1.0 field at 1.80 degrees) respectively. As seen from FIG. 4 the MTF on-axis yields high resolution at approximately 50% at 22 cycles/mm.

TABLE 1 and TABLE 2 are the fabrication data for the IR Afocal optical design for the NFOV and WFOV configurations respectfully. All dimensions are given in inches, where each lens element is described in terms of radius of curvature for front and back of each lens, and CC denotes concave and CX denotes convex. A "dummy" imager is inserted after the afocal exit pupil in order to evaluate image quality. For this reason, the fabrication data will list infinite conjugates such as effective focal length (EFL) and F# (FNO) which are based upon an arbitrary "dummy" imager focal length. Image diameter shown is a paraxial value, it is not a ray traced value, and thickness is axial distance to next surface. The reference wavelength is 10,000.0 nm for the spectral region of 8000.0 to 10,000.0 nm range. "Front" and "Back" refer to the side of the lens closest to the object and image side respectively.

TABLE ONE

| ELEMENT | RADIUS OF CURVATURE | | | APERTURE DIAMETER | | |
|---|---|---|---|---|---|---|
| NUMBER | FRONT | BACK | THICKNESS | FRONT | BACK | GLASS |
| OBJECT | INF | | INFINITY | | | |
| 10 | A (1) | 64.5168 CC | 1.2000 | 14.4369 | 14.2047 | 'gaas' |
| | | | 10.6930 | | | |
| 12 | 8.0431 CX | A (2) | 1.2478 | 7.8763 | 7.1793 | 'gaas' |
| | | | 0.0721 | | | |
| 13 | A (3) | 4.6266 CC | 0.4000 | 6.6298 | 5.7553 | ZNS |
| | | | 5.1399 | | | |
| | | | | | 1.5969 | |
| | | | 1.5821 | | | |
| 15 | A (4) | 10.1790 CC | 0.4000 | 2.0569 | 2.4486 | ZNS |
| 16 | 68.5653 CX | A (5) | 1.1053 | 2.6728 | 3.0424 | 'gaas' |
| | | | 2.5000 | | | |
| | | | | | 1.9992 | |
| | | | 0.0000 | | | |
| | | APERTURE STOP | | 1.9992 | | |
| | | | 2.0000 | | | |
| | | | | | 2.7157 | |
| IMAGE | IMAGE DISTANCE = | | 4.0000 | | | |
| | INF | | | | 1.7609 | |

TABLE TWO

| ELEMENT | RADIUS OF CURVATURE | | | APERTURE DIAMETER | | |
|---|---|---|---|---|---|---|
| NUMBER | FRONT | BACK | THICKNESS | FRONT | BACK | GLASS |
| OBJECT | INF | | INFINITY | | | |
| 10 | A (6) | 64.5168 CC | 1.2000 | 14.0285 | 13.7583 | 'gaas' |
| | | | 1.0000 | | | |
| 30 | −9.1061 CC | A (7) | 0.3298 | 3.7343 | 3.8325 | 'gaas' |
| | | | 1.0862 | | | |
| 31 | −5.2253 CC | A (8) | 0.4000 | 4.1461 | 4.3775 | ZNS |
| | | | 6.7602 | | | |
| 32 | 21.2945 CX | A (9) | 0.7067 | 8.6495 | 8.6306 | 'gaas' |

TABLE TWO-continued

| ELEMENT | RADIUS OF CURVATURE | | | APERTURE DIAMETER | | |
|---|---|---|---|---|---|---|
| NUMBER | FRONT | BACK | THICKNESS | FRONT | BACK | GLASS |
| | | | 0.4100 | | | |
| 12 | 8.0431 CX | A (10) | 1.2478 | 7.7507 | 7.0389 | 'gaas' |
| | | | 0.0721 | | | |
| 13 | A (11) | 4.6266 CC | 0.4000 | 6.4890 | 5.6311 | ZNS |
| | | | 5.1399 | | | |
| | | | | | 1.1155 | |
| 15 | A (12) | 10.1790 CC | 1.5821 | 1.5115 | 1.8649 | ZNS |
| | | | 0.4000 | | | |
| | | | 0.1228 | | | |
| 16 | 68.5653 CX | A (13) | 1.1053 | 2.1481 | 2.5664 | 'gaas' |
| | | | 2.5000 | | | |
| | | | | | 2.0129 | |
| | | | 0.0000 | | | |
| | | | APERTURE STOP | | 2.0129 | |
| | | | 2.0000 | | | |
| | | | | | 2.4009 | |
| IMAGE | IMAGE DISTANCE = INF | | 4.0000 | | 0.8600 | |

Surfaces given in TABLE 1 and 2 as A( ) denote aspheric surfaces governed by the following equation:

$$\frac{(CURV)Y^2}{1+\{1-(1+K)(CURV)^2 Y^2\}^{1/2}} * (A)Y^4 + (B)Y^6 + (C)Y^8 + (D)Y^{10}$$

whereby the aspheric constants are listed in TABLE 3:

TABLE THREE

| ASPHERIC | CURV | K | A | B | C | D |
|---|---|---|---|---|---|---|
| A (1) | 0.03370780 | 0.000000 | −4.45170E−06 | 8.20696E−09 | −2.57532E−10 | 4.09212E−13 |
| A (2) | 0.08147280 | 0.000000 | −2.07200E−05 | 2.79387E−07 | −1.89034E−07 | 7.89119E−09 |
| A (3) | 0.13381960 | 0.000000 | −2.53978E−04 | −5.25269E−08 | −5.36648E−07 | 2.99429E−08 |
| A (4) | −0.33333333 | 0.000000 | 3.84896E−02 | 6.79456E−03 | −1.04450E−02 | 7.69781E−03 |
| A (5) | −0.33333333 | 0.000000 | 4.08406E−03 | 9.41133E−04 | −3.88707E−04 | 1.19099E−04 |
| A (6) | 0.03370780 | 0.000000 | −3.34170E−06 | 8.20696E−09 | −2.57532E−10 | 4.09212E−13 |
| A (7) | −0.01947810 | 0.000000 | −1.13353E−04 | −3.76078E−05 | −7.94363E−06 | 9.68760E−07 |
| A (8) | −0.19554050 | 0.000000 | 1.76906E−04 | −6.26166E−07 | 4.09053E−06 | 6.90652E−07 |
| A (9) | −0.01476125 | 0.000000 | 9.13334E−05 | 2.43422E−07 | −2.65317E−08 | 5.18144E−10 |
| A (10) | 0.08147280 | 0.000000 | −2.07200E−05 | 2.79387E−07 | −1.89034E−07 | 7.89119E−09 |
| A (11) | 0.13381960 | 0.000000 | −2.53978E−04 | −5.25269E−08 | −5.36648E−07 | 2.99429E−08 |
| A (12) | −0.33333333 | 0.000000 | 3.84896E−02 | 6.79456E−03 | −1.04460E−02 | 7.69781E−03 |
| A (13) | −0.33333333 | 0.000000 | 5.08406E−03 | 9.41133E−04 | −3.88707E−04 | 1.19099E−04 |

TABLE 4 and TABLE 5 are the listings of the infinite conjugates for the NFOV configuration and WFOV configuration respecfully.

TABLE 4

| EFL = | −28.0163 |
|---|---|
| BFL = | 4.0059 |
| FFL = | −113.6156 |
| F/NO = | −2.0012 |
| IMAGE DIST = | 4.0000 |
| OAL = | 26.4630 |
| PARAXIAL IMAGE HT = | 0.8804 |
| SEMI-FIELD ANGLE = | 1.8000 |
| ENTR PUPIL DIAMETER = | 14.0000 |
| DISTANCE = | −15.5738 |
| EXIT PUPIL DIAMETER = | 4.0006 |
| DISTANCE = | −4.0000 |

TABLE 5

| EFL = | −7.4572 |
|---|---|
| BFL = | 4.0140 |
| FFL = | −3.8303 |
| F/NO = | −1.9939 |
| IMAGE DIST = | 4.0000 |

TABLE 5-continued

| OAL = | 26.4629 |
|---|---|
| PARAXIAL IMAGE HT = | 0.4300 |
| SEMI-FIELD ANGLE = | 3.3000 |
| ENTR PUPIL DIAMETER = | 3.7400 |
| DISTANCE = | 3.1089 |
| EXIT PUPIL DIAMETER = | 4.0192 |
| DISTANCE = | −4.0000 |

In TABLE 4 and TABLE 5, the FFL is measured from the first surface while BFL is measured from the last surface.

Although the ZnS lenses do not lose internal transmission over temperature as does Germanium, ZnS does have a nominally high internal absorption coefficient of about 0.08 $cm^{-1}$ at 9.0 microns. For this reason, the thickness of the ZnS lenses are purposefully limited to 0.4 cm, thereby limiting thermal transmission losses to about 3.15% per element.

TABLES 6 and 7 are the wavefront analysis for the NFOV and WFOV configurations respectively. Strehl as denoted in the tables is the intensity at the peak of the point image as a fraction of the peak of the aberration-free image with the same vignetting and obscuration. The approximation used for both NFOV and WFOV is generally valid for RMS<0.1.

TABLE 6

| | | | | |
|---|---|---|---|---|
| X REL. FIELD | 0.00 | 0.00 | 0.00 |
| Y REL. FIELD | 0.00 | 0.56 | 1.00 |
| WEIGHTS | 1.00 | 0.88 | 0.50 |
| NUMBER OF RAYS | 948 | 894 | 742 |
| WAVELENGTHS | 10000.0 | 9000.0 | 8000.0 |
| WEIGHTS | 1 | 1 | 1 |

| FIELD | | | BEST INDIVIDUAL FOCUS | | | BEST COMPOSITE FOCUS | | | |
|---|---|---|---|---|---|---|---|---|---|
| FRACT | DEG | SHIFT | FOCUS (CM.) | RMS (CM.) | STREHL (WAVES) | SHIFT | FOCUS (CM.) | RMS (CM.) | STREHL (WAVES) |
| X 0.00 | 0.00 | 0.000000 | −0.000566 | 0.031 | 0.962 | 0.000000 | −0.000464 | 0.031 | 0.962 |
| Y 0.00 | 0.00 | 0.000000 | | | | 0.000000 | | | |
| X 0.00 | 0.00 | 0.000000 | 0.000483 | 0.035 | 0.953 | 0.000000 | −0.000464 | 0.036 | 0.949 |
| Y 0.56 | 1.00 | 0.000119 | | | | 0.000184 | | | |
| X 0.00 | 0.00 | 0.000000 | −0.002695 | 0.074 | 0.807 | 0.000000 | −0.000464 | 0.076 | 0.795 |
| Y 1.00 | 1.80 | 0.000056 | | | | −0.000220 | | | |

The composite RMS for TABLE 6 is 0.044 waves.

TABLE 7

| | | | | |
|---|---|---|---|---|
| X REL. FIELD | 0.00 | 0.00 | 0.00 |
| Y REL. FIELD | 0.00 | 0.55 | 1.00 |
| WEIGHTS | 1.00 | 0.88 | 0.50 |
| NUMBER OF RAYS | 948 | 948 | 908 |
| WAVELENGTHS | 10000.0 | 9000.0 | 8000.0 |
| WEIGHTS | 1 | 1 | 1 |

| FIELD | | | BEST INDIVIDUAL FOCUS | | | BEST COMPOSITE FOCUS | | | |
|---|---|---|---|---|---|---|---|---|---|
| FRACT | DEG | SHIFT | FOCUS (CM.) | RMS (CM.) | STREHL (WAVES) | SHIFT | FOCUS (CM.) | RMS (CM.) | STREHL (WAVES) |
| X 0.00 | 0.00 | 0.000000 | −0.000753 | 0.029 | 0.967 | 0.000000 | −0.000363 | 0.029 | 0.966 |
| Y 0.00 | 0.00 | 0.000000 | | | | 0.000000 | | | |
| X 0.00 | 0.00 | 0.000000 | −0.000448 | 0.068 | 0.835 | 0.000000 | −0.000363 | 0.068 | 0.835 |
| Y 0.55 | 1.80 | 0.000608 | | | | 0.000605 | | | |
| X 0.00 | 0.00 | 0.000000 | 0.000687 | 0.112 | 0.609 | 0.000000 | −0.000363 | 0.113 | 0.606 |
| Y 1.00 | 3.30 | 0.001144 | | | | 0.001203 | | | |

The composite RMS for TABLE 7 is 0.068 waves.

The afocal assembly of the present invention is "simplified" in design due in part to the manufacturing tolerances present for each lens element surface. TABLE 8 is the centered tolerance listings for both NFOV and WFOV configurations. Radius, radius tolerance, thickness and thickness tolerance are all given in cm. Fringes of power and irregularity are at 546.1 nm. over the clear aperture, and irregularity is defined as fringes of cylinder power in test plate fit.

TABLE 8

| | RADIUS | FRINGES | | THICKNESS | | INDEX | V-NC. | INHOMO |
|---|---|---|---|---|---|---|---|---|
| SUR | RADIUS | TOL | POW/IRR | THICKNESS | TOL | GLASS | TOL | (%) GENEITY |
| 1 | | | | 4.00000 | | | | |
| 2 | 29.66670 | 0.0040 | 2.00.50 | 1.20000 | 0.01000 | 'gaas' | 0.00100 | 0.5 |
| 3 | 64.51678 | 0.0200 | 2.00.50 | 10.69296 | | | | |
| 4 | 8.04309 | 0.0020 | 2.00.50 | 1.24784 | 0.6020 | 'gaas' | 0.00040 | 0.50 |
| 5 | 12.27403 | 0.0020 | 2.00.50 | 0.07206 | 0.6020 | | | |
| 6 | 7.47274 | 0.0020 | 4.01.00 | 0.40000 | 0.00200 | ZNS | 0.00050 | 0.20 |
| 7 | 4.62661 | 0.0020 | 2.00.50 | 5.13987 | 0.00400 | | | |

TABLE 8-continued

| SUR | RADIUS | FRINGES | | THICKNESS | | GLASS | INDEX V-NC. INHOMO | |
|---|---|---|---|---|---|---|---|---|
| | RADIUS | TOL | POW/IRR | THICKNESS | TOL | GLASS | TOL | (%) GENEITY |
| 8 | | | | 1.58207 | | | | |
| 9 | −3.00000 | 0.0020 | 2.01.00 | 0.40000 | 0.00200 | ZNS | 0.00150 | 0.4 |
| 10 | 10.17901 | 0.0080 | 2.01.00 | 0.12276 | 0.00200 | | | |
| 11 | 68.56531 | 0.2000 | 2.00.50 | 1.10533 | 0.00200 | 'gaas' | 0.00050 | 0.5 |
| 12 | −3.00000 | 0.0020 | 2.01.00 | 2.50000 | 0.05000 | | | |
| 13 | | | | 0.00000 | 0.5000 | AIR | | |
| 14 | | | | 2.00000 | | | | |
| 15 | | | | 4.00000 | | | | |
| 16 | | | | 0.00000 | | | | |

Tolerance limits for TABLE 8 are given below:
  RADIUS=0.0020 (min)
  SAG=0.0002 (min) and 0.0050 (max)
  POWER=2.0 (min) and 12.0 (max)
  IRREGULARITY=0.50 (min) and 3.00 (max)
  THICKNESS=0.00200 (min) and 0.05000 (max)
  INDEX=0.00010 (min) and 0.00200 (max)
  V-NUMBER(%)=0.20 (min) and 0.80 (max)
Where Radius tolerance is determined by both radius and sagital limits, and power tolerance is between 2 and 4 times the irregularity tolerance.

Decentered tolerances are shown in TABLE 9 for both NFOV and WFOV configurations, where radii are given in units of centimeters.

For wedge and tilt, TIR is a single indicator measurement taken at the smaller of the two clear apertures. For decenter and roll, TIR is a measurement of the induced wedge and is the maximum difference in readings between two indicators, one for each surface, with both surfaces measured at their respective clear apertures. The direction of measurement is parallel to the original optical axis of the element before the perturbation is applied.

Another indicator of "simplified" design is a manufacturable MTF resolution for the tolerances to be applied to a specific design. TABLE 10 shows the predictable manufacturable MTF resolution summary. Equal weighting was given for the 10,000 nm, 9000 nm, and 8,000 nm ranges.

TABLE 9

| ELEMENT NO. | FRONT RADIUS | BACK RADIUS | ELEMENT WEDGE | | ELEMENT TILT | | E1. DEC/ROLL (R) | |
|---|---|---|---|---|---|---|---|---|
| | | | TIR | ARC MIN | TIR | ARC MIN | TIR | cm. |
| 1 | 29.66670 | 64.51678 | 0.0002 | 0.0 | 0.0043 | .0 | 0.0005 | 0.0020 |
| 2 | 8.04309 | 12.27403 | 0.0002 | 0.1 | 0.0022 | 1.0 | 0.0008 | 0.0020 |
| 3 | 7.47274 | 4.62661 | 0.0002 | 0.1 | 0.0017 | 1.0 | 0.0007 | 0.0020 |
| 4 | −3.00000 | 10.17901 | 0.0002 | 0.3 | 0.0006 | 1.0 | 0.0019 | 0.0020 |
| 5 | 68.56531 | 3.00000 | 0.0002 | 0.3 | 0.0008 | .3 | 0.0021 | 0.0020 |
| 6 | | | | | | | | |

TABLE 10

| | relative field | freq L/MM | azim deg | weight | design | design + tol | compensator range (+/−) |
|---|---|---|---|---|---|---|---|
| NFOV | 0.00, 0.00 | 20.00 | TAN | 1.0 | 0.556 | 0.511 | 0.039098 |
| | 0.00, 0.61 | 20.00 | TAN | 1.0 | 0.437 | 0.400 | 0.039098 |
| | 0.00, 1.00 | 20.00 | TAN | 1.0 | 0.261 | 0.219 | 0.039098 |
| WFOV | 0.00, 0.00 | 20.00 | TAN | 1.0 | 0.529 | 0.481 | 0.062368 |
| | 0.00, 0.61 | 20.00 | TAN | 1.0 | 0.447 | 0.407 | 0.062368 |
| | 0.00, 1.00 | 20.00 | TAN | 1.0 | 0.267 | 0.222 | 0.062368 |

The change in MTF is a mean plus 2 sigma value and assumes a uniform distribution of manufacturing errors over the range for all tolerances except decentration errors which have a truncated Gaussian distribution in the x and y directions.

This disclosure describes an improvement to optical designs often used for military FLIR systems operating in the 8–12 micron infra-red (IR) spectral region, but the technique could also be applied for other infra-red imaging applications. The invention is a dual-field of view (FOV) re-imaging optical Afocal Lens Assembly which avoids use of Germanium lens materials that are so common in the prior art.

This compact Dual Field of View IR Afocal design offers an improvement over the current state-of-the-art by completely avoiding the use Germanium lens materials, but yet still offers performance and packaging flexibility comparable to an equivalently complex Germanium design. The lenses are made of Gallium Arsenside (GaAs) and Zinc Sulfide (ZnS), which do not suffer transmission losses at temperatures from −50 degree C. to 100 degree C., and undergo shifts in index of refraction with temperature less-than one-third than that of Germanium. Both ZnS and GaAs are insoluble in water and provide the hardness required for military environments. Further advancements in the state-of-the art include the avoidance of cemented doublets and achievement of a near diffraction-limited narrow FOV with only five lenses. All lens materials are designed for high transmission in the 8–12 micron spectral region.

For military FLIR (Forward Looking Infra-Red) sensor applications, a scanner could be located in the exit pupil and would scan the horizontal field of view through imaging optics onto a cold shielded focal plane array. The Afocal optics are designed for minimal performance degradation at temperatures ranging from −50° C. to +100° C. This is achieved by eliminating the use of Germanium as a lens material. The intermediate image plane between the Afocal's focusing "objective" and collimating "eyepiece" sections can be used with optical power limiting devices which require high energy gain in small focus spot sizes.

In the Narrow FOV, the Afocal has 7× magnifying power, a 14 cm entrance pupil diameter, and a 2 cm diameter exit pupil wherein a scanner may be located. The NFOV configuration provides a minimum 1.8° circular FOV. With the addition of the Wide FOV lenses, the Afocal has a magnification ratio of about 3.73×, an entrance pupil diameter of 3.74 cm, and maintains an exit pupil diameter of 2 cm. The WFOV configuration provides a minimum 3.8° circular FOV. The WFOV lenses are inserted or removed by an electronically controlled mechanism. The addition of the WFOV lenses requires no compensatory motion of any of the NFOV lenses or position of a scanner within the exit pupil, although some compensation in the position of the first wide FOV lens group would likely be required for manufacturing purposes.

The afocal offers 7× power and a circular field of view of at least 3.6 degree in the narrow, and 1.87× power and at least 6.6 degree in the wide. The wide field of view is achieved by switching in three additional elements behind the front lens. The Afocal may be switched between two different fields of view by flipping in or out three wide field lenses. The narrow FOV offers more angular magnification and resolution than the wide FOV. The present invention is a "simplified" design since no cemented doublets are required and standard manufacturing tolerances typical of diamond machining are sufficient for achieving desired performance. The Afocal is shown to have near-diffraction limited image quality in both fields of view, and requires only five lenses for the narrow FOV and eight lenses for the wide FOV. Germanium lenses are avoided because Germanium undergoes serious optical performance degradation as temperature increases beyond 50 degrees Celsius due to its relatively large dn/dT value and its increasing photon absorption.

While this invention has been described in terms of preferred embodiment consisting of the assembly disclosed, those skilled in the art will recognize that the invention can be practiced with modification within the spirit and scope of the appended claims.

What is claimed is:

1. An infrared (IR) afocal lens assembly for providing an observed magnified IR image scene with alternative field of view and a substantially lens temperature independent performance, the IR afocal lens assembly comprising:

a collecting lens on an optical axis for collecting IR input light, said collecting lens further including a GaAs meniscus lens;

a focusing lens subassembly on the optical axis after said collecting lens for providing focus, said focusing lens subassembly including one focusing single GaAs lens and one focusing single ZnS lens, said focusing lens subassembly movable along the optical axis to provide range focus;

an intermediate focal plane on the optical axis after said focusing lens subassembly, said intermediate focal plane having an intermediate focus;

an eyepiece lens subassembly on the optical axis after said intermediate focal plane for collimating the intermediate focus and providing an external exit pupil, said eyepiece lens subassembly including one eyepiece single ZnS lens and one eyepiece single GaAs lens, an aperture stop on the optical axis which defines the exit pupil of the IR afocal assembly, whereby substantially no change in index of refraction and absorption occurs with increase in lens temperatures up to approximately 100 degrees Celsius, and such that a narrow field of view (NFOV) of an IR image is observed magnified through the IR afocal lens assembly.

2. An infrared (IR) afocal lens assembly for providing an observed magnified IR image scene with alternative field of view and a substantially lens temperature independent performance, the IR afocal lens assembly comprising:

a collecting lens on an optical axis for collecting IR input light, said collecting lens further including a GaAs meniscus lens;

a focusing lens subassembly on the optical axis after said collecting lens for providing focus, said focusing lens subassembly including one focusing single GaAs lens and one focusing single ZnS lens;

an intermediate focal plane on the optical axis after said focusing lens subassembly, said intermediate focal plane having an intermediate focus;

an eyepiece lens subassembly on the optical axis after said intermediate focal plane for collimating the intermediate focus and providing an external exit pupil, said eyepiece lens subassembly including one eyepiece single ZnS lens and one eyepiece single GaAs lens, an aperture stop on the optical axis which defines the exit pupil of the IR afocal assembly, said aperture stop may be varied up to 0.5 cm along the optical axis, whereby substantially no change in index of refraction and absorption occurs with increase in lens temperatures up to approximately 100 degrees Celsius, and such that a narrow field of view (NFOV) of an IR image is observed magnified through the IR afocal lens assembly.

3. An infrared (IR) afocal lens assembly for providing an observed magnified IR image scene with alternative field of view and a substantially lens temperature independent performance, the IR afocal lens assembly comprising:

a collecting lens on an optical axis for collecting IR input light, said collecting lens further including a GaAs meniscus lens;

a focusing lens subassembly on the optical axis after said collecting lens for providing focus, said focusing lens subassembly including one focusing single GaAs lens and one focusing single ZnS lens;

an intermediate focal plane on the optical axis after said focusing lens subassembly, said intermediate focal plane having an intermediate focus;

an eyepiece lens subassembly on the optical axis after said intermediate focal plane for collimating the intermediate focus and providing an external exit pupil, said eyepiece lens subassembly including one eyepiece single ZnS lens and one eyepiece single GaAs lens, an aperture stop on the optical axis which defines the exit pupil of the IR afocal assembly, whereby substantially no change in index of refraction and absorption occurs with increase in lens temperatures up to approximately 100 degrees Celsius, and such that a narrow field of view (NFOV) of an IR image is observed magnified at an optical magnification of approximately 7× through the IR afocal lens assembly.

4. An infrared (IR) afocal lens assembly for providing an observed magnified IR image scene with alternative field of view and a substantially lens temperature independent performance, the IR afocal lens assembly comprising:

a collecting lens on an optical axis for collecting IR input light, said collecting lens further including a GaAs meniscus lens;

a focusing lens subassembly on the optical axis after said collecting lens for providing focus, said focusing lens subassembly including one focusing single GaAs lens and one focusing single ZnS lens;

an intermediate focal plane on the optical axis after said focusing lens subassembly, said intermediate focal plane having an intermediate focus;

an eyepiece lens subassembly on the optical axis after said intermediate focal plane for collimating the intermediate focus and providing an external exit pupil, said eyepiece lens subassembly including one eyepiece single ZnS lens and one eyepiece single GaAs lens, an aperture stop on the optical axis which defines the exit pupil of the IR afocal assembly, whereby substantially no change in index of refraction and absorption occurs with increase in lens temperatures up to approximately 100 degrees Celsius, and such that a narrow field of view (NFOV) of an IR image is observed magnified, with a minimum circular field of view of approximately 3.6 degrees, through the IR afocal lens assembly.

5. An infrared (IR) afocal lens assembly for providing an observed magnified IR image scene with alternative field of view and a substantially lens temperature independent performance, the IR afocal lens assembly comprising:

a collecting lens on an optical axis for collecting IR input light, said collecting lens further including a GaAs meniscus lens;

a wide field of view (WFOV) lens subassembly on the optical axis after said GaAs meniscus lens for providing a WFOV, said WFOV lens subassembly further including two WFOV single GaAs lenses and one WFOV single 0.40 cm thick ZnS lens;

a focusing lens subassembly on the optical axis after said collecting lens for providing focus, said focusing lens subassembly including one focusing single GaAs lens and one focusing single ZnS lens;

an intermediate focal plane on the optical axis after said focusing lens subassembly, said intermediate focal plane having an intermediate focus;

an eyepiece lens subassembly on the optical axis after said intermediate focal plane for collimating the intermediate focus and providing an external exit pupil, said eyepiece lens subassembly including one eyepiece single ZnS lens and one eyepiece single GaAs lens, an aperture stop on the optical axis which defines the exit pupil of the IR afocal assembly, whereby substantially no change in index of refraction and absorption occurs with increase in lens temperatures up to approximately 100 degrees Celsius, and such that a narrow field of view of an IR image and a wide field of view of an IR image are observed magnified through the IR afocal lens assembly.

6. The IR afocal lens assembly of claim 5 wherein the focusing lens subassembly is movable along the optical axis to provide range focus.

7. The IR afocal lens assembly of claim 5 wherein the aperture stop may be varied up to 0.5 cm along the optical axis.

8. The IR afocal lens assembly of claim 5 further including an optical magnification of approximately 3.73×.

9. The IR afocal lens assembly of claim 5 further including a minimum circular field of view of approximately 7.6 degrees.

* * * * *